US009280376B2

(12) United States Patent
Alessio et al.

(10) Patent No.: US 9,280,376 B2
(45) Date of Patent: Mar. 8, 2016

(54) SYSTEM AND METHOD FOR RESIZING A VIRTUAL DESKTOP INFRASTRUCTURE USING VIRTUAL DESKTOP INFRASTRUCTURE MONITORING TOOLS

(71) Applicant: Dell Products, LP, Round Rock, TX (US)

(72) Inventors: Ed Alessio, Austin, TX (US); John Kelly, Limerick (IE)

(73) Assignee: Dell Products, LP, Round Rock, TX (US)

( * ) Notice: Subject to any disclaimer, the term of this patent is extended or adjusted under 35 U.S.C. 154(b) by 52 days.

(21) Appl. No.: 14/276,544

(22) Filed: May 13, 2014

(65) Prior Publication Data

US 2015/0331703 A1 Nov. 19, 2015

(51) Int. Cl.
*G06F 9/455* (2006.01)
*G06F 9/50* (2006.01)

(52) U.S. Cl.
CPC .............. *G06F 9/45533* (2013.01); *G06F 9/50* (2013.01); *G06F 9/5077* (2013.01)

(58) Field of Classification Search
CPC ...... G06F 9/45533; G06F 9/50; G06F 9/5077
USPC .......................................................... 718/1
See application file for complete search history.

(56) References Cited

U.S. PATENT DOCUMENTS

| | | | |
|---|---|---|---|
| 7,626,587 B1 | 12/2009 | de Waal et al. | |
| 8,161,126 B2 | 4/2012 | Fan | |
| 8,234,236 B2 * | 7/2012 | Beaty ................... | G06F 9/5077 706/45 |
| 8,640,126 B2 * | 1/2014 | Halperin ............. | G06F 9/45537 718/1 |
| 8,683,466 B2 * | 3/2014 | Raj Seeniraj ............. | G06F 8/38 718/1 |
| 8,856,783 B2 * | 10/2014 | Sharp .................. | G06F 9/45558 718/1 |
| 8,887,172 B2 * | 11/2014 | Bernardi ............... | G06F 9/4445 709/227 |
| 2009/0216975 A1 * | 8/2009 | Halperin ............. | G06F 9/45537 711/162 |
| 2010/0275200 A1 * | 10/2010 | Radhakrishnan ..... | G06F 9/4445 718/1 |
| 2010/0306163 A1 * | 12/2010 | Beaty ................... | G06F 9/5077 706/52 |
| 2011/0161957 A1 * | 6/2011 | Bernardi ............... | G06F 9/4445 718/1 |
| 2012/0089980 A1 * | 4/2012 | Sharp .................. | G06F 9/45558 718/1 |
| 2012/0167085 A1 | 6/2012 | Subramaniyan et al. | |
| 2012/0304168 A1 * | 11/2012 | Raj Seeniraj ......... | G06F 9/4445 718/1 |
| 2013/0073731 A1 | 3/2013 | Bose et al. | |
| 2013/0086579 A1 * | 4/2013 | Venkat ................ | G06F 9/45558 718/1 |
| 2013/0212579 A1 * | 8/2013 | Ben-Shaul .......... | G06F 9/45533 718/1 |
| 2014/0082612 A1 * | 3/2014 | Breitgand ............. | G06F 9/5077 718/1 |

OTHER PUBLICATIONS

Miller et al., "Virtualization, Virtually at the Desktop," Oct. 2007, ACM, p. 255-260.*
"Sizing of Virtual Desktop Infrastructures," 2011, Fujitsu, p. 1-32.*
"SR-IOV Networking in Xen: Architecture, Design and Implementation," Dong et al. Date unknown.
"High Performance Network Virtualization with SR-IOV," Dong et al., IEEE High Performance Computer Architecture (HPCA), 2010 IEEE 16th International Symposium, Jan. 2010.

* cited by examiner

*Primary Examiner* — Qing Chen
(74) *Attorney, Agent, or Firm* — Larson Newman, LLP (57) ABSTRACT

A method includes launching a virtual machine based upon an image on a virtualization host, associating the virtual machine with a user, monitoring a metric of the virtual machine that measures usage of a resource of the virtual machine, determining that the metric has exceeded a threshold more than an allowable number of times in a time period, determining an additional amount of the resource to increase in the virtual machine, updating the image to include the additional amount of the resource, launching a second virtual machine based upon the updated image, and associating the second virtual machine with the user.

20 Claims, 3 Drawing Sheets

SYSTEM AND METHOD FOR RESIZING A VIRTUAL DESKTOP INFRASTRUCTURE USING VIRTUAL DESKTOP INFRASTRUCTURE MONITORING TOOLS

FIELD OF THE DISCLOSURE

This disclosure relates generally to information handling systems, and more particularly relates for resizing a virtual desktop infrastructure (VDI) using VDI monitoring tools.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. A virtual desktop infrastructure separates a desktop environment and its associated software in a data center, from the information handling system that is used to access the desktop environment.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
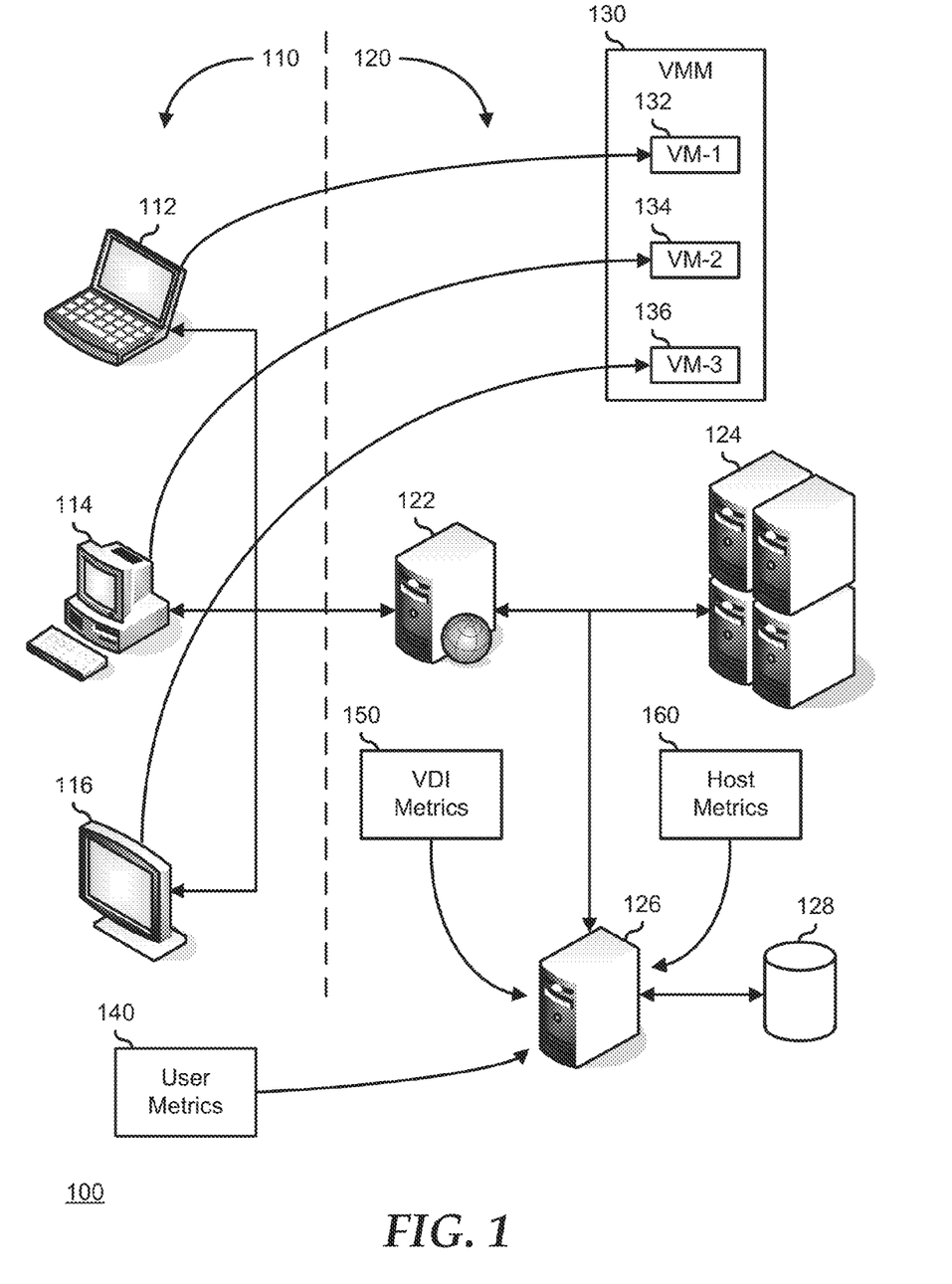
FIG. 1 is a block diagram of an information handling system according to an embodiment of the present disclosure.

FIG. 1 illustrates a virtual desktop environment 100 that can be implemented on one or more information handling system. For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An example of an information handling system includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Virtual desktop environment 100 includes a user environment 110 and a virtual desktop infrastructure (VDI) 120. User environment 110 includes user systems 112, 114, and 116. VDI 120 includes a virtual desktop manager 122, a virtualization host 124, a VDI manager 126, and a metrics database 128. Virtual desktop environment 100 operates to present a remotely operated and maintained operating system environment and application software to users 112, 114, and 116. In particular, when one of users 112, 114, and 116 logs on to VDI 120, virtual desktop manager 122 authenticates the user, determines the operating system environment and application software needs of the user, and directs virtualization host 124 to instantiate a virtual machine that is associated with the user, and that runs the operating system environment and application software. Virtualization host 124 includes a virtual machine manager (VMM) 130 that operates to manage the virtual machines. Thus when user 112 logs on to VDI 120, virtual desktop manager 122 directs virtualization host 124 to instantiate a virtual machine 132 associated with the user. Similarly, a virtual machine 134 is instantiated when user 114 logs on to VDI 120, and a virtual machine 136 is instantiated when user 116 logs on.

In a particular embodiment, two or more of virtual machines 132, 134, and 136 are instantiated from a common image, such that each of the virtual machines is utilizing the same operating system environment and application software. In this way, any patches, modifications, or upgrades that are applied to the common image are thereby promulgated to the particular users 112, 114, or 116 that are using the common image. In this way, the cost of maintenance and service for virtual desktop environment 100 is reduced over maintaining separate operating system environments and application software for each of users' 112, 114, and 116 systems. By using the common image, each of users 112, 114, and 116 can operate using the same operating system environment and application software, without regard to what type of system each user operates. In another embodiment, one or more of virtual machines 132, 134, and 136 is instantiated from a different image, such that the virtual machine is utilizing a different operating system environment or application software.

In a particular embodiment, each of users 112, 114, and 116 log on to VDI 120 over a protected network, such as a corporate wide-area network (WAN), local area network (LAN), intranet, or the like, such that the users have secure access to their respective virtual machines 132, 134, and 136. In another embodiment, each of users 112, 114, and 116 log on to VDI 120 over a public network, such as the Internet, a publicly accessible Wi-Fi network, or the like. Here, desktop manager 122 operates to ensure that users 112, 114, and 116 have secure access to their respective virtual machines 132, 134, and 136. For example, desktop manager 122 can operate to provide a virtual private network (VPN) or another secure communication channel to users 112, 114, and 116. In this way, the access to each user to their respective operating system environments and application software is available to the users from remote locations and through a wide array of connected devices. In yet another embodiment, each of users 112, 114, and 116 have the option of using a protected network or a public network.

In a particular embodiment, virtual machines 132, 134, and 136 remain instantiated on virtualization host 124 when the respective users 112, 114, and 116 log off of their virtual desktop. Here, a particular user can be provided with unique access to their own virtual desktop, such that any changes made, such as to personalize the virtual desktop, are maintained after logging off and later logging back on in a later session. However, in this embodiment, virtualization host 124 incurs an overhead by keeping virtual machines 132, 134, and 136 instantiated, even when no user 112, 114, or 116 is logged on. In another embodiment, virtual machines 132, 134, and 136 remain instantiated on virtualization host 124 when the respective users 112, 114, and 116 log off of their virtual desktop. However, here no particular user is associated with a particular virtual desktop, and each time the user logs back on, the virtual desktop is unchanged from the previous session. In this embodiment, virtualization host 124 can keep one or more of virtual machines 132, 134, and 136 instantiated, and then can instantiate additional virtual machines as the number of users increases. For example, in this way a data center can allocate processing resources of virtualization host 124 to running virtual desktops during business hours, and can allocate the processing resources to other tasks during the off hours.

Virtual desktop manager 122 operates to manage the connections between users 112, 114, and 116 and VDI 120, including authentication, user locations, session state, timeouts, and the like. In the embodiment where virtual machines 132, 134, and 136 remain instantiated, virtual desktop manager 122 operates to manage the unused virtual machines, and assign a virtual machine to a user when a new user logs on to VDI 120. In the embodiment where virtual machines 132, 134, and 136 are dynamically instantiated on virtualization host 124, desktop manager 122 operates to determine when to instantiate new virtual machines, or to halt existing virtual machines.

Virtual desktop environment 100 operates to continuously gather information related to the performance of the environment. As such, virtual desktop environment 100 gathers user metrics 140, VDI metrics 150, and host metrics 160, which are collected by VDI manager 126, and stored in metrics database 128. User metrics 140 include monitors, alerts, logs, agent processes, and the like, that are determined based upon the usage of VDI 120 by users 112, 114, and 116. For example, network flow information between users 112, 114, and 116, and VDI 120 can be collected, such as maximum and minimum data bandwidth, network latency, network collisions, dropped packets, virtual machine log on delay, average length of time per session, session start and end times, or other information as needed or desired. In addition, user metrics 140 can be provided based upon a quantification of data received from a technical support team, such as the number of times a particular issue generates a ticket across a number of users. In a particular embodiment, user metrics 130 are collected as aggregate information that relates to all of users 112, 114, and 116, together. In another embodiment, user metrics 130 are collected as information from users 112, 114, and 116, individually.

VDI metrics 150 include monitors, alerts, logs, agent processes, and the like, that are determined based upon activity within VDI 120. For example, network flow information between desktop manager 122, virtualization host 124, and VDI manager 126 can be collected, such as maximum and minimum data bandwidth, network latency, network collisions, dropped packets, or other information as needed or desired.

Host metrics 160 include monitors, alerts, logs, agent processes, and the like, that are determined based upon the usage of virtualization host 124. For example, device and system utilization information within the hardware and software of virtualization host 124, or within virtual machines 132, 134, and 136 can be collected, such as maximum and minimum CPU utilization, IO bandwidth, storage utilization, storage latency, number of page faults, or other information as needed or desired. The skilled artisan will recognize that the above listed metrics are exemplary and that other measures of performance in virtual desktop environment than those listed above can be utilized in conjunction with the teachings described herein.

In a particular embodiment, VDI manager 126 operates to use the gathered user metrics 140, VDI metrics 150, and host metrics 160 to calculate recommendations for upgrading and expanding VDI 120. In particular, VDI manager 126 analyzes the information stored in metrics database 128 to determine if one or more of virtual desktop manager 122, virtualization host 124, the network components that interconnect the virtual desktop manager, the virtualization host, and users 112, 114, and 116, or any components of the virtual desktop manager, the virtualization host, and the users are in need of upgrading based on past and present usage, and on projected growth in the future.

Here, VDI manager 126 operates to determine if any of the hardware resources of virtualization host 124 are within various usage threshold limits. For example, VDI manager 126 operates to determine if hardware or software resources of virtualization host 124, such as memory or disk storage capacity, processing capacity, IO capacity, or other usages are within predetermined threshold limits. If the usage of one or more of the hardware or software resources of virtualization host 124 exceed the predetermined thresholds, VDI manager 126 provides a recommendation to expand the capacity of the virtualization host in order to bring the utilization level back within the predetermined threshold limit.

In addition, VDI manager 126 analyzes the usage of virtual machines 132, 134, and 136 by users 112, 114, and 116 to determine if the resources allocated to the virtual machines are optimally suited to the needs of the users. For example, in the embodiment where two or more of virtual machines 132, 134, and 136 are instantiated from a common image, VDI manager 126 operates to determine if any of users 112, 114, and 116 operate with a greater or a lesser proportion of a particular resource of the associated virtual machine 132, 134, and 136. With this information, VDI manager 126 operates to recommend that the common image be configured to include more or less of the particular resource, or to recommend that one or more of users 112, 114, and 116 be provided with a unique image that includes more or less of the particular resource. For example, if all of virtual machines 132, 134, and 136 routinely operate such that the allocated CPU processing power is utilized over a threshold, then VDI manager 126 can reconfigure the common image to include greater CPU processing power, whereas if only virtual machine 132 routinely operates such that the allocated CPU processing power is utilized over the threshold, then VDI manager 126 can reconfigure virtual machine 132 to include greater CPU processing power, and can assign user 112 to operate from a unique image that instantiates the reconfigured virtual machine, while virtual machines 134 and 136 can be left to operate from the common image.

In a particular embodiment, VDI manager 126 operates to provide a recommended configuration for a new virtual desktop environment, based upon the metrics information included in metrics database 128, such that the modeling of resource allocations provided in virtual desktop environment 100 can be used as key learnings to make the recommendation. In another embodiment, VDI manager 126 operates to provide a recommended configuration for expanding virtual desktop environment 100. For example, where virtual desktop environment is utilized as a pilot program to better determine the configuration for a fuller virtual desktop deployment, VDI manager 126 operates to evaluate the metrics information to determine if more or less of a particular resource is needed to adequately expand to the fuller virtual desktop deployment.

Figure 2:
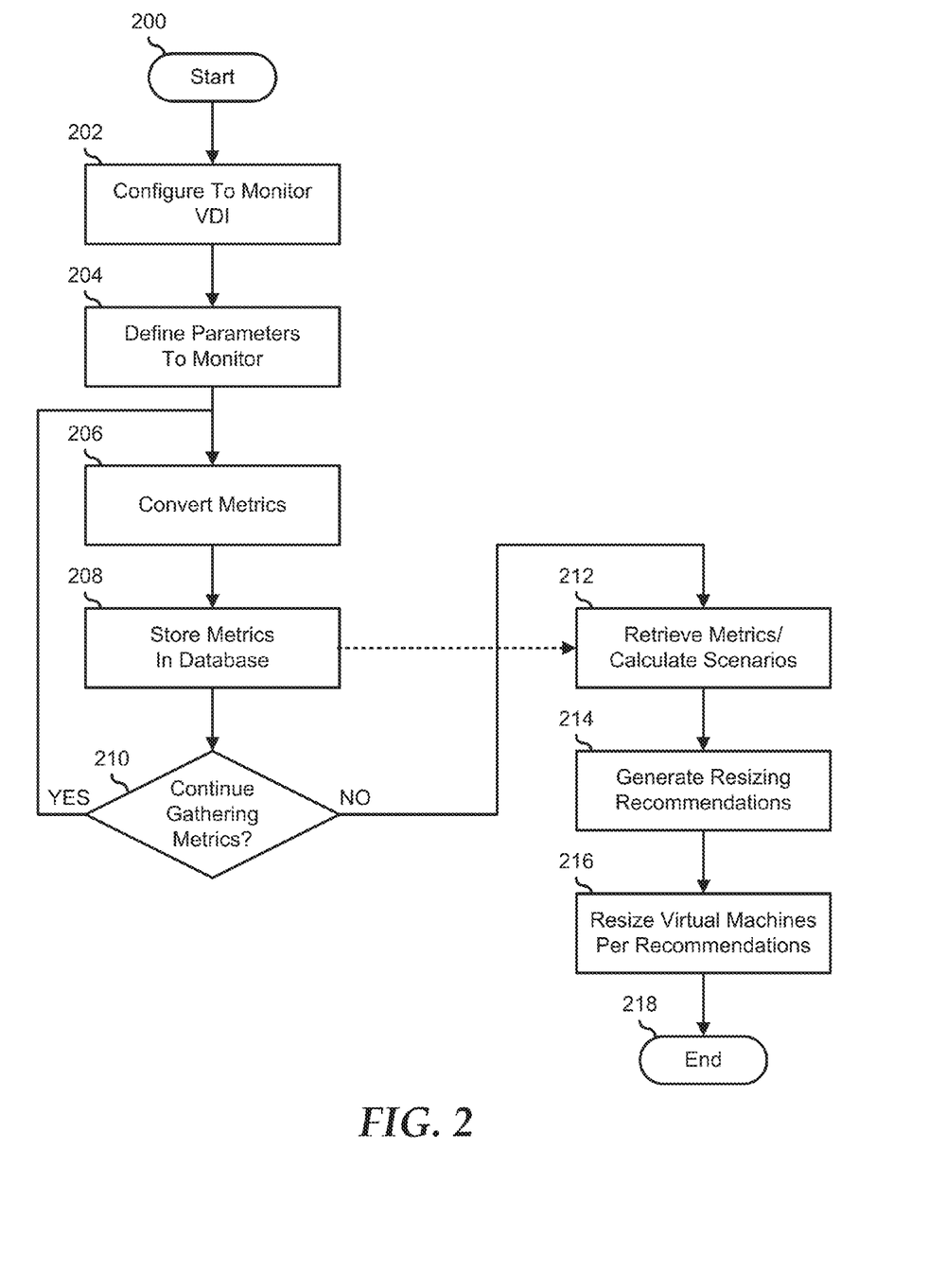
FIG. 2 is a flowchart of a method of gathering and evaluating metrics for determining to change a desktop virtualization environment configuration according to an embodiment of the present disclosure.

FIG. 2 illustrates a method of gathering and evaluating metrics for determining to change a desktop virtualization environment configuration, beginning at block 200. A VDI manager is configured to monitor a particular virtual desktop environment in block 202. The VDI manager defines the parameters of the virtual desktop environment to be monitored in block 204. The parameters that are monitored are converted to usable metrics in block 206. For example, an amount of time a CPU spends processing for a particular virtual machine can be converted into a usage percentage of the CPU for the virtual machine. The metrics are stored in a metrics database in block 208.

A decision is made as to whether or not the VDI manager is to continue monitoring the virtual desktop environment in decision block 210. If so, the "YES" branch of decision block 210 is taken and the method returns to block 206 where the monitored parameters are converted to usable metrics. If the VDI manager is not to continue monitoring the virtual desktop environment, the "NO" branch of decision block 210 is taken and the metrics are retrieved from the database and are used to calculate resizing scenarios in block 212, and resizing recommendations are generated for the virtual desktop environment in block 214. The virtual machines that are recommended to be resized are resized in block 216, and the method ends in block 218.

In providing recommendations for modifications to VDI 120, including to desktop virtualization manager 122, to virtualization host 124, to virtual machines 132, 134, and 136, or to users 112, 114, and 116, VDI manager 126 operates to receive various metrics related to the capabilities, capacities, hardware, software, and other elements related to the present configuration of virtual desktop environment 100. For example, VDI manager 126 can receive a configuration inventory (CI) that can include a number of CPUs or processor cores, a memory capacity and a memory throughput, a disk storage capacity and disk access latency, other IO configuration information, such as network controllers, and the like. Further, for each item in the CI, VDI manager 126 can receive a maximum configuration (MC) for each item. Finally, VDI manager 126 can receive a resource map (RM) that provides a mapping between resources and resource utilization parameters and the hardware items that provide the particular resources, and a measurement of the utilization of the resource (RU—described below). For example, a CPU utilization may be measured as a number of cores associated with a virtual machine, as an overall percentage of task switched processing activity is being utilized, or as an individual percentage of virtual machine processing activity is being utilized.

VDI manager 126 also operates to receive information related to the actual resource usage (RU) over time. In a particular embodiment, more than one time period can be evaluated. For example, $RU_{short}$ can relate to the resource utilization for a particular resource over a one hour time period with a 20 second sampling interval, and $RU_{long}$ can relate to the resource utilization for the particular resource over a one month time period with a five minute sampling interval. Other durations and sampling intervals can be utilized, as needed or desired.

Finally, VDI manager 126 operates to define various thresholds related to the resource usage. For example, $TRU_{short}$ can define a level of resource utilization over a one hour duration that triggers an over-usage alert, and $ATRU_{short}$ can define a number of alerts over a one hour duration, above which a reallocation of resources to increase capacity is indicated. Similarly, $TRU_{long}$ can define a level of resource utilization over a one month duration that triggers an over-usage alert, and, and $ATRU_{long}$ can define a number of alerts over a one month duration, above which a reallocation of resources to increase capacity is indicated. The skilled artisan will recognize that similar thresholds can be defined that relate to determining that there is an overcapacity for a particular resource, and that a reclamation of that resource is indicated. As such, the present specification will describe activities related to usages and thresholds that are associated with over-use of a particular resource, and to increasing the capacity of the virtual desktop environment. However, it will be understood that activities related to usages and thresholds that are associated with under-use of a particular resource, and to reclaiming the capacity of the virtual desktop environment, is herein similarly contemplated. In a particular embodiment, virtual desktop manager 122 and VDI manager 126 are each functions of a single information handling system, or functions of each can be allocated across multiple information handling systems.

The following is pseudo-code for the pre-monitoring activity:
   Record CI, MC, and RM
The following is pseudo-code for activities processing of metrics:

```
Configure VDI manager with RU_short, RU_long, TRU_short, TRU_long,
   ATRU_short, and ATRU_long parameters - determine when
   ATRU_short and ATRU_long are exceeded
Store RU_short, RU_long, for all resources of the virtual desktop environment
Store events where ATRU_short and ATRU_long have been exceeded
```

The following is pseudo-code for determining if the amount of hardware resources of the virtual desktop infrastructure needs to be increased:

```
Read CI, MC, and RM
IF ATRU_short for hardware resource has been exceeded
   Lookup RM to ascertain hardware resource where more resource is
      required
   Lookup CI to ascertain hardware configuration of CI from perspective
      of relevant hardware resource
   IF all components of CI that provide the relevant hardware resource
      are configured with the max level per MC
         Add new instance of hardware resource per RM
   ELSEIF all of CI that provide the relevant hardware resource are not
      configured with the max level per MC
         Increase configured level of relevant resource of hardware
            resource
   Update CI
ENDIF
ELSE IF ATRU_long for hardware resource has been exceeded
   Lookup RM to ascertain hardware resource where more resource is
      required
   Lookup CI to determine hardware configuration of hardware resource
   IF all components of CI that provide the relevant hardware resource
      are configured with the max level per MC
         Add new instance of hardware resource per RM
   ELSEIF all of CI that provide the relevant hardware resource are not
      configured with the max level per MC
         Increase configured level of relevant resource of hardware
            resource
   Update CI
ENDIF
```

The following is pseudo-code for determining if virtual machine resources of the virtual desktop infrastructure needs to be increased:

```
Read RM
IF Virtual ATRU_short for virtual machine resource has been exceeded
   Lookup RM to ascertain virtual resource to resize
   Reconfigure virtual machine image with additional virtual resource
      based on RM
ENDIF
ELSE IF Virtual ATRU_long for virtual machine resource has been exceeded
   Lookup RM to determine virtual resource to resize
   Reconfigure virtual machine image with additional virtual resource
      based on RM
ENDIF
```

The following is pseudo-code for applying the above resource allocation algorithm to resizing of a virtual desktop environment pilot program, where "X" represents a number of users in the pilot program, "Y" represents a number of users in a full implementation of the virtual desktop environment, and "n" represents the ratio of the number of users in the full implementation to the number of users in the pilot program:

$$CI_Y = n * CI_X$$

Figure 3:
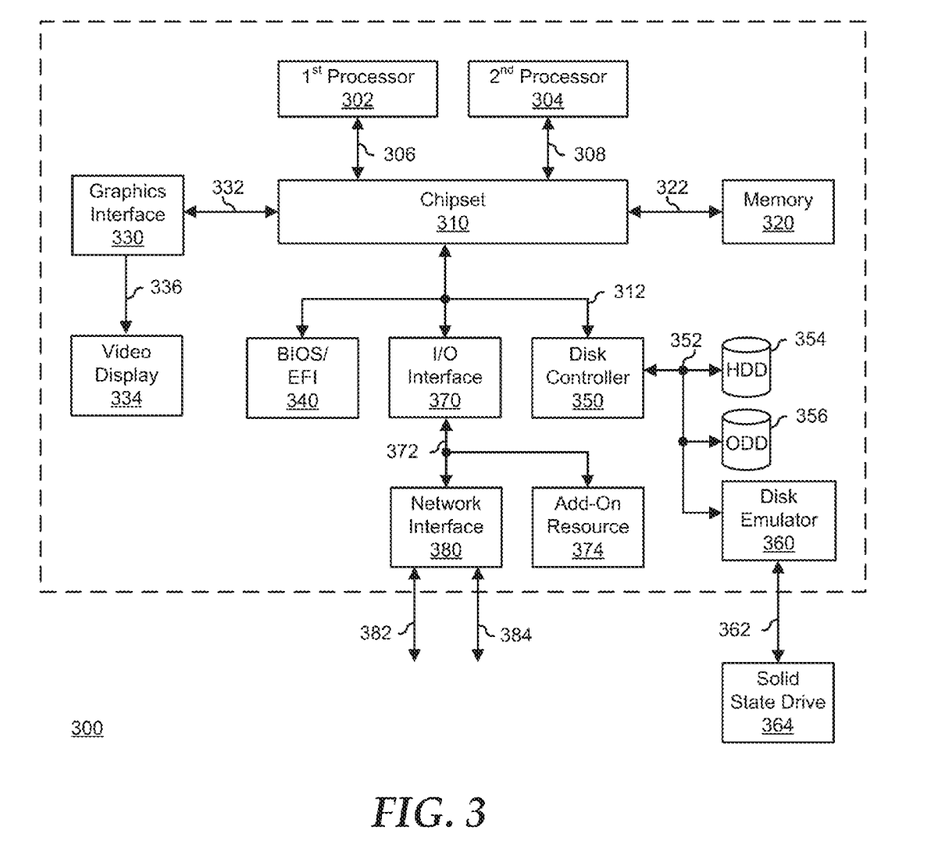
FIG. 3 is a block diagram illustrating a generalized information handling system according to an embodiment of the present disclosure.

FIG. 3 illustrates a generalized embodiment of information handling system 300. For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described above, and operates to perform one or more of the methods described above. Information handling system 300 includes a processors 302 and 304, a chipset 310, a memory 320, a graphics interface 330, include a basic input and output system/extensible firmware interface (BIOS/EFI) module 340, a disk controller 350, a disk emulator 360, an input/output (I/O) interface 370, and a network interface 380. Processor 302 is connected to chipset 310 via processor interface 306, and processor 304 is connected to the chipset via processor interface 308. Memory 320 is connected to chipset 310 via a memory bus 322. Graphics interface 330 is connected to chipset 310 via a graphics interface 332, and provides a video display output 336 to a video display 334. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 340 includes BIOS/EFI code operable to detect resources within information handling system 300, to provide drivers for the resources, initialize the resources, and access the resources. BIOS/EFI module 340 includes code that operates to detect resources within information handling system 300, to provide drivers for the resources, to initialize the resources, and to access the resources.

Disk controller 350 includes a disk interface 352 that connects the disc controller to a hard disk drive (HDD) 354, to an optical disk drive (ODD) 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits a solid-state drive 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to an add-on resource 374 and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as chipset 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    launching, on a virtualization host of a virtual desktop environment, a first virtual machine based upon a first image;
    associating, by the virtualization host of the virtual desktop environment, the first virtual machine with a first user of the virtual desktop environment;
    monitoring, by a virtual desktop environment management system, a first metric of the first virtual machine, the first metric being a measurement of usage of a first resource of the first virtual machine;
    determining, by the virtual desktop environment management system, that the first metric of the first virtual machine has exceeded a first threshold more than a first allowable number of times in a first time period;
    determining, by the virtual desktop environment management system, a first additional amount of the first resource of the first virtual machine to increase in the first virtual machine;
    updating, by the virtual desktop environment management system, the first image to include the first additional amount of the first resource of the first virtual machine;
    launching, on the virtualization host of the virtual desktop environment, a second virtual machine based upon the updated first image, in response to updating the first image; and
    associating, by the virtualization host of the virtual desktop environment, the second virtual machine with the first user of the virtual desktop environment.

2. The method of claim 1, further comprising, in further response to updating the first image:
    launching, on the virtualization host of the virtual desktop environment, a third virtual machine based upon the updated first image; and
    associating, by the virtualization host of the virtual desktop environment, the third virtual machine with a second user of the virtual desktop environment.

3. The method of claim 2, further comprising, in further response to updating the first image:
    launching, on the virtualization host of the virtual desktop environment, a fourth virtual machine based upon the updated first image; and
    associating, by the virtualization host of the virtual desktop environment, the fourth virtual machine with the second user of the virtual desktop environment.

4. The method of claim 2, further comprising, in further response to updating the first image:
    maintaining, by the virtualization host of the virtual desktop environment, the association between the third virtual machine and the second user of the virtual desktop environment.

5. The method of claim 1, further comprising:
    monitoring, by the virtual desktop environment management system, a second metric of the first virtual machine, the second metric being a measurement of usage of a second resource of the first virtual machine;

determining, by the virtual desktop environment management system, that the second metric of the first virtual machine has gone below a second threshold more than a second allowable number of times in a second time period;

determining, by the virtual desktop environment management system, a first decreased amount of the second resource of the first virtual machine to decrease in the first virtual machine;

re-updating, by the virtual desktop environment management system, the first image to include the first decreased amount of the second resource of the first virtual machine;

launching, on the virtualization host of the virtual desktop environment, a third virtual machine based upon the re-updated first image, in response to re-updating the first image; and associating, by the virtualization host of the virtual desktop environment, the third virtual machine with the first user of the virtual desktop environment.

6. The method of claim 5, further comprising, in further response to re-updating the first image:

launching, on the virtualization host of the virtual desktop environment, a fourth virtual machine based upon the re-updated first image; and associating, by the virtualization host of the virtual desktop environment, the fourth virtual machine with a second user of the virtual desktop environment.

7. The method of claim 6, further comprising, in further response to re-updating the first image:

launching, on the virtualization host of the virtual desktop environment, a fifth virtual machine based upon the re-updated first image; and associating, by the virtualization host of the virtual desktop environment, the fifth virtual machine with the second user of the virtual desktop environment.

8. The method of claim 6, further comprising, in further response to re-updating the first image:

maintaining, by the virtualization host of the virtual desktop environment, the association between the fourth virtual machine and the second user of the virtual desktop environment.

9. The method of claim 1, further comprising:

monitoring, by the virtual desktop environment management system, a first metric of the virtualization host of the virtual desktop environment, the first metric being a measurement of usage of a first resource of the virtualization host of the virtual desktop environment;

determining, by the virtual desktop environment management system, that the first metric of the virtualization host of the virtual desktop environment has exceeded a first threshold more than a first allowable number of times in a first time period;

determining, by the virtual desktop environment management system, a first additional amount of the first resource of the virtualization host of the virtual desktop environment to increase in the virtualization host of the virtual desktop environment; and upgrading, by the virtual desktop environment management system, the virtualization host of the virtual desktop environment to include the first additional amount of the first resource of the virtualization host of the virtual desktop environment.

10. A non-transitory computer readable medium storing code for performing a method, the method comprising:

launching, on a virtualization host of a virtual desktop environment, a first virtual machine based upon a first image;

associating, by the virtualization host of the virtual desktop environment, the first virtual machine with a first user of the virtual desktop environment;

monitoring, by a virtual desktop environment management system, a first metric of the first virtual machine, the first metric being a measurement of usage of a first resource of the first virtual machine;

determining, by the virtual desktop environment management system, that the first metric of the first virtual machine has exceeded a first threshold more than a first allowable number of times in a first time period;

determining, by the virtual desktop environment management system, a first additional amount of the first resource of the first virtual machine to increase in the first virtual machine;

updating, by the virtual desktop environment management system, the first image to include the first additional amount of the first resource of the first virtual machine;

launching, on the virtualization host of the virtual desktop environment, a second virtual machine based upon the updated first image, in response to updating the first image; and associating, by the virtualization host of the virtual desktop environment, the second virtual machine with the first user of the virtual desktop environment.

11. The on-transitory computer readable medium of claim 10, wherein the method further comprises, in further response to updating the first image:

launching, on the virtualization host of the virtual desktop environment, a third virtual machine based upon the updated first image; and associating, by the virtualization host of the virtual desktop environment, the third virtual machine with a second user of the virtual desktop environment.

12. The non-transitory computer readable medium of claim 11, wherein the method further comprises, in further response to updating the first image:

launching, on the virtualization host of the virtual desktop environment, a fourth virtual machine based upon the updated first image; and associating, by the virtualization host of the virtual desktop environment, the fourth virtual machine with the second user of the virtual desktop environment.

13. The non-transitory computer readable medium of claim 11, wherein the method further comprises, in further response to updating the first image:

maintaining, by the virtualization host of the virtual desktop environment, the association between the third virtual machine and the second user of the virtual desktop environment.

14. The non-transitory computer readable medium of claim 10, wherein the method further comprises:

monitoring, by the virtual desktop environment management system, a second metric of the first virtual machine, the second metric being a measurement of usage of a second resource of the first virtual machine;

determining, by the virtual desktop environment management system, that the second metric of the first virtual machine has gone below a second threshold more than a second allowable number of times in a second time period;

determining, by the virtual desktop environment management system, a first decreased amount of the second resource of the first virtual machine to decrease in the first virtual machine;

re-updating, by the virtual desktop environment management system, the first image to include the first decreased amount of the second resource of the first virtual machine;

launching, on the virtualization host of the virtual desktop environment, a third virtual machine based upon the re-updated first image, in response to re-updating the first image; and associating, by the virtualization host of the virtual desktop environment, the third virtual machine with the first user of the virtual desktop environment.

15. The non-transitory computer readable medium of claim 14, wherein the method further comprises, in further response to re-updating the first image:

launching, on the virtualization host of the virtual desktop environment, a fourth virtual machine based upon the re-updated first image; and associating, by the virtualization host of the virtual desktop environment, the fourth virtual machine with a second user of the virtual desktop environment.

16. The non-transitory computer readable medium of claim 15, wherein the method further comprises, in further response to re-updating the first image:

launching, on the virtualization host of the virtual desktop environment, a fifth virtual machine based upon the re-updated first image; and associating, by the virtualization host of the virtual desktop environment, the fifth virtual machine with the second user of the virtual desktop environment.

17. The non-transitory computer readable medium of claim 15, wherein the method further comprises, in further response to re-updating the first image:

maintaining, by the virtualization host of the virtual desktop environment, the association between the fourth virtual machine and the second user of the virtual desktop environment.

18. The non-transitory computer readable medium of claim 10, wherein the method further comprises:

monitoring, by the virtual desktop environment management system, a first metric of the virtualization host of the virtual desktop environment, the first metric being a measurement of usage of a first resource of the virtualization host of the virtual desktop environment;

determining, by the virtual desktop environment management system, that the first metric of the virtualization host of the virtual desktop environment has exceeded a first threshold more than a first allowable number of times in a first time period;

determining, by the virtual desktop environment management system, a first additional amount of the first resource of the virtualization host of the virtual desktop environment to increase in the virtualization host of the virtual desktop environment; and upgrading, by the virtual desktop environment management system, the virtualization host of the virtual desktop environment to include the first additional amount of the first resource of the virtualization host of the virtual desktop environment.

19. A virtual desktop infrastructure comprising:

a virtualization host comprising a processor and a memory, wherein the virtualization host is operable to:

launch a first virtual machine based upon a first image; and associate the first virtual machine with a first user of the virtual desktop infrastructure; and a virtual desktop environment management system comprising a processor and a memory, wherein the virtual desktop environment management system is operable to:

monitor a first metric of the first virtual machine, the first metric being a measurement of usage of a first resource of the first virtual machine;

determine that the first metric of the first virtual machine has exceeded a first threshold more than a first allowable number of times in a first time period;

determine a first additional amount of the first resource of the first virtual machine to increase in the first virtual machine;

update the first image to include the first additional amount of the first resource of the first virtual machine; and direct the virtualization host to:

launch a second virtual machine based upon the updated first image, in response to updating the first image; and associate the second virtual machine with the first user of the virtual desktop environment.

20. The virtual desktop infrastructure of claim 19, wherein the virtual desktop environment management system is further operable to:

monitor a first metric of the virtualization host, the first metric being a measurement of usage of a first resource of the virtualization host;

determine that the first metric of the virtualization host has exceeded a first threshold more than a first allowable number of times in a first time period;

determine a first additional amount of the first resource of the virtualization host to increase in the virtualization host; and upgrade the virtualization host to include the first additional amount of the first resource of the virtualization host.

* * * * *